United States Patent
Chu et al.

(10) Patent No.: US 8,311,345 B2
(45) Date of Patent: Nov. 13, 2012

(54) METHOD AND SYSTEM FOR DETECTING FLAME

(75) Inventors: Hsin-Sen Chu, Hsinchu (TW);
Chung-Hsien Lu, Jhubei (TW);
Shen-Kuen Chang, Chiayl (TW);
Hao-Ting Chao, Dadu Township, Taichung County (TW); Cheng-Wei Wang, Tainan (TW); Kun-Lin Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 392 days.

(21) Appl. No.: 12/619,889

(22) Filed: Nov. 17, 2009

(65) Prior Publication Data
US 2010/0142822 A1   Jun. 10, 2010

(30) Foreign Application Priority Data
Dec. 5, 2008  (TW) .............. 97147563 A
Apr. 15, 2009  (TW) .............. 98112571 A

(51) Int. Cl.
*G06K 9/62* (2006.01)
(52) U.S. Cl. ......... 382/224; 382/181; 382/190; 382/266
(58) Field of Classification Search .............. None
See application file for complete search history.

(56) References Cited

U.S. PATENT DOCUMENTS

| | | | |
|---|---|---|---|
| 5,153,722 A * | 10/1992 | Goedeke et al. | 348/159 |
| 5,625,342 A | 4/1997 | Hall et al. | |
| 6,310,974 B1 * | 10/2001 | Persiantsev et al. | 382/232 |
| 6,937,743 B2 | 8/2005 | Rizzotti et al. | 382/100 |
| 7,286,704 B2 | 10/2007 | Pfefferseder et al. | |
| 2005/0271247 A1 | 12/2005 | Privalov | |

FOREIGN PATENT DOCUMENTS
TW    I235964    7/2005

OTHER PUBLICATIONS
Phillips et al. "Flame Recognition in Video" 2000 IEEE: 0-7695-0813-8/00.
Ho et al. "An Early Fire-Detection Method Based on Image Processing" 2004 IEEE: 0-7803-8554-3/04.

* cited by examiner

*Primary Examiner* — Chan S Park
*Assistant Examiner* — Elisa Rice
(74) *Attorney, Agent, or Firm* — Allen, Dyer, Doppelt, Milbrath & Gilchrist, P.A.

(57) ABSTRACT

A method and system for detecting flames are provided. The flame detection method based on image processing techniques performs the following steps to detecting flames. It first finds one or more bright objects in the images that are captured from videos. A flickering state of a bright object is then determined. To verify the existence of a flame, additionally subsequent images from the instant that a bright object first appears are utilized and the similar steps are applied to them. Finally a flame could be detected if the analyzed results are positive after the aforementioned steps have been performed.

11 Claims, 7 Drawing Sheets

METHOD AND SYSTEM FOR DETECTING FLAME

FIELD OF THE INVENTION

The present invention relates to a method and system for detecting a flame, and more particularly to a method and a system for detecting a flame by using image processing and analysis methods.

BACKGROUND OF THE INVENTION

Since the scales of the buildings are bigger and bigger, the altitudes thereof are higher and higher and the structures thereof are more and more complicated, the conventional fire fighting facilities have not been able to ensure the safety thereof. For example, the conventional fire detector cannot effectively detect a fire in high and large areas or the outdoors, and even in the indoors, it has drawbacks such as slow reaction and high cost since a large number of sensors, wiring and controlling systems need to be installed. But a video-based detection system can solve those problems.

Video-based flame detection systems have some advantages, such as short response time, wide detection area, immediately-confirmable scene of a fire and ease for maintenance. These systems use cameras to acquire streaming videos, and then analyze that if a flame object exists in the monitored area. For example, the U.S. Pat. No. 6,937,743B2 disclosed a method and a monitoring system for detecting fire events in a specified area by analyzing the color variation of a plurality of images.

At present, most video-based or image-based techniques for fire detection are based on color features and/or temporally flicking frequency analyses and then to classify whether an extracted object is a flame. However, there always exists contradiction between computation burden and detection performance among those existing methodologies. Therefore, an effective video-based analysis method for detecting a fire is essential while discriminating flame objects from non-flame ones in the images. The present method significantly accelerates the response time, reduces the computation effort of detection algorithm, and improves the efficiency of detection rate.

SUMMARY OF THE INVENTION

A flame detecting method and system which achieve high performance and detection accuracy are provided in the present invention, in which spatial motion is used to be the primary principle to determine if a flame object is existing in a plurality of images that are captured from videos.

The spatial motion of a flame is influenced by buoyancy in the air, such as a spatially flickering state of a flame.

In accordance with one aspect of the present invention, a method using image processing and analysis techniques to detect a flame is provided. The flame detecting method comprises steps of capturing a plurality of images from streaming video inputs; determining if a bright object exists in each of the images; starting a flame validation scheme by analyzing a fixed number of subsequent images from the time step once a bright object appears.

Preferably, the procedure of determining whether a bright object appears in an image further comprises sub-steps of: discriminating between bright pixels and non-bright pixels by using YUV components; and grouping and labeling the bright pixels to form one or more bright objects in an image.

Preferably, the flame validation scheme among successive images further comprises steps of: defining an area of interest (AOI) in the first image of subsequent captured ones; analyzing whether the bright object inside the AOI is in a spatially flickering state between the successive images; counting the total number of images having a bright object that is in the spatially flickering state; and finally determining that a flame occurs within the analyzed images.

Preferably, the spatially flickering state could be one of three different states described as follows: 1) A state that the upper edge of a bright object is currently in the flickering state. To be precise, this state implies that a bright object having an upper edge is in a flickering state, resulted from a flickering motion of an upper part of a flame; 2) A state that the upper edge is in the flickering state and the lower edge is in the non-flickering state. This state considers that a flame may have an upper part being continuously flickering and a stationary lower part; and 3) A state that the upper edge and lower edge of a bright object are both in the flickering state and the moving directions of the upper and lower edges are opposite.

The last kind of aforementioned states may occur in some special environments, such as night or a floor apt to reflect, in such environment a flame object in a monitor will have an appearance of expansion or contraction, and thus the upper edge and the lower edge will have different moving directions. In other words, the lower edge has a downward moving direction when the upper edge has an upward moving direction (i.e. the flame object is expanding), and the lower edge has an upward moving direction when the upper edge has a downward moving direction (i.e. the flame object is contracting).

A bright object resulted from a flame may conform to one of the aforementioned state types, and therefore the flickering states could be the fundamental criterion to analyzing whether the bright object is in a spatially flickering state.

Preferably, the procedure of determining whether a bright object is in a spatially flickering state further comprises sub-steps of: locating the upper and lower edges of a bright object; calculating the flickering ratio of upper edge and non-flickering ratios of upper and lower edges, respectively; determining that the upper edge is now in the flickering state if the flickering ratio exceeds a predefined threshold; determining the lower edge is in the flickering (or non-flickering) state if the flickering (or non-flickering) ratio exceeds corresponding thresholds; and concluding that a bright object is in a spatially flickering state by considering the flickering and non-flickering states of upper and lower edges.

Preferably, each of the analyzing steps is periodically repeated. The crucial step is to determine whether a bright object is regarded as a flame after a fixed number of images has been analyzed.

Based on the previous description, a method for detecting a flame and a system thereof are proposed in the present invention. The method adopts specific characteristics of a flame, i.e., spatial motion of a flame. The present invention not only overcomes the drawbacks in the prior art but also achieves high efficiency. Therefore, the present invention has utility for industry.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present preferred embodiment will now be described more specifically with reference to the following embodiments. Notably, the following descriptions of preferred embodiments of this invention are presented herein for the purposes of illustration and description only; it is not intended to be exhaustive or to be limited to the precise form disclosed.

Figure 1A:
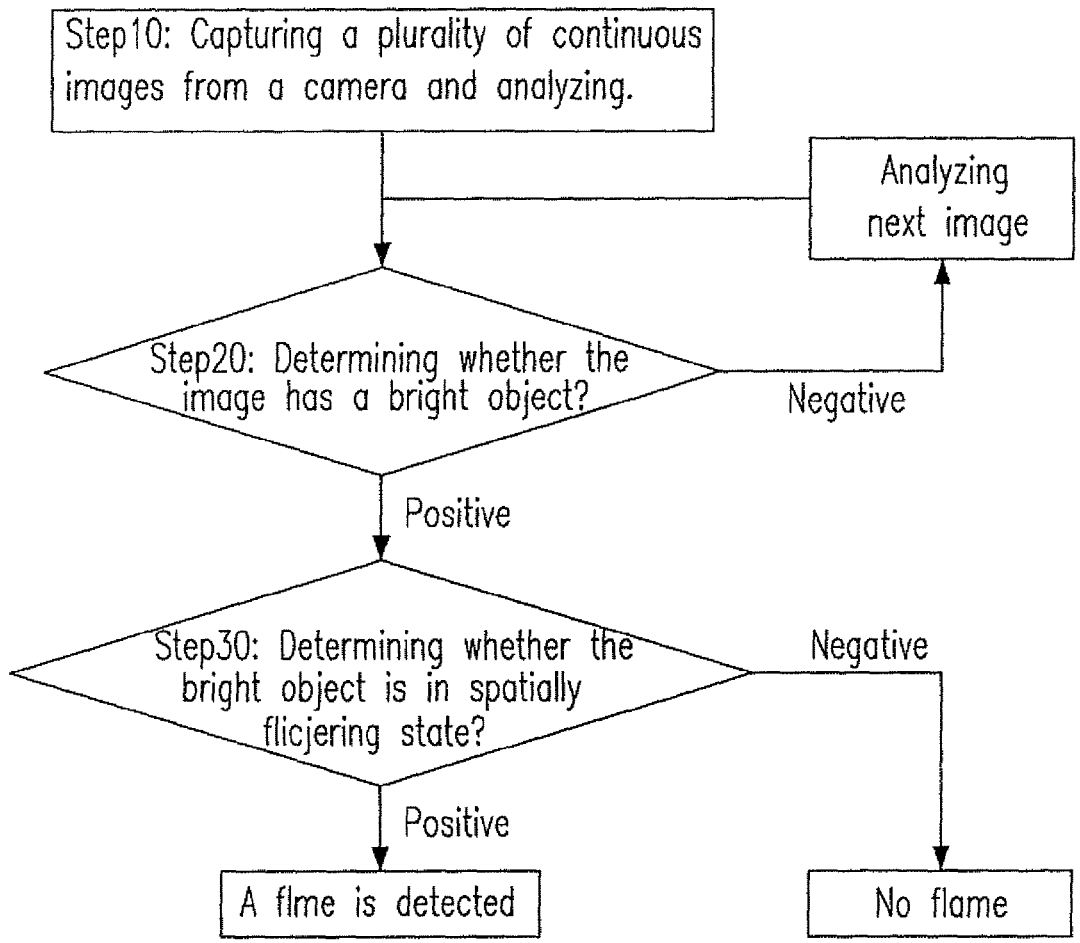
FIG. 1(A) is a flowchart of a method for detecting a flame according to a preferred embodiment of the present invention.

FIG. 1(A) shows an overall flowchart of a method for detecting a flame according to a preferred embodiment of the present invention. Step 10 is a step of acquiring a plurality of continuous images in a monitored area. In this embodiment, the images are captured by a video, and a sampling rate is set as 15 frames per second.

These continuously acquired images are then analyzed to judge that if one or more bright objects exist in the images (see Step 20). Consider a specified pixel (i,j) in an image at first, this pixel is regarded as a bright pixel if its YUV components respectively locate in predetermined intervals that were obtained using statistical methodology from extensive experiments. In this embodiment, the following condition is adopted to classify a pixel as a bright pixel:

IF $(220 \leq Y(i,j) \leq 248)$ AND $(-18 \leq U(i,j) \leq 2)$ AND $(-8 \leq V(i,j) \leq 18)$, THEN the pixel $(i,j)$ is a bright pixel, where $Y(i,j)$ is luminance component, and $U(i,j)$ and $V(i,j)$ are two chrominance components of pixel (i,j), respectively. Secondly, the classified bright pixels are further grouped and labeled to form one or more objects using four-neighbor connected component method. When the result of this step is positive, i.e., there is one or more bright objects in the images, it implies that a flame may exist in the monitored area.

Subsequently, the next step is to analyze whether a bright object is in a spatially flickering state (see Step 30) in order to confirm that if a bright object is a flame. When the result of this step is positive, the existence of a flame is confirmed. In the aforementioned embodiment, the detailed sub-steps of determining that a bright object is in a flickering state are illustrated in FIG. 1(K).

The spatially flickering state in the present invention could be selected from one of the following conditions: (1) A bright object has upper edge in a flickering state; (2) A bright object simultaneously has upper edge in the flickering state but lower edge in a non-flickering state; and (3) A bright object has both upper edge and lower edge in a flickering state, and the moving directions of these two edges are opposite. To analyze whether the motion mode of the bright object conforms to one of the mentioned three kinds of spatially flickering states, the following steps are performed in the present embodiment.

In the aforementioned embodiment, the upper edge and lower edge of a bright object should be first determined as follows. Once a bright object has been detected in the image, the subsequent J images, including the one at this time instant, are first captured for the following confirmation process.

Provided that the first image of the J images has a bright object. First, a region occupied by a bright object in the first image is set as an area of interest (AOI) by extending the bright object to meet double height and width. Among the J images, the pixels in AOI of each image are then classified into two different groups, including bright pixels and non-bright pixels. The bright pixels and non-bright pixels are marked as "P" and "N". Then, the AOI parts in two successive images are superimposed with each other, so as to obtain (J−1) superimposed results. According to previous definition of pixels "P" and "N", the pixels in AOI among (J−1) superimposed parts are further categorized into four types of classes I, II, III and IV:

Class I: the pixel is defined as "N" both in the former and latter images of the two successive images;

Class II: the pixel is defined as "N" in the former image and defined as "P" in the latter image;

Class III: the pixel is defined as "P" in the former image and defined as "N" in the latter image; and Class IV: the pixel is defined as "P" both in the former and latter images.

The upper edge is composed of a set of pixels in which each pixel (i,j) is in State IV and having its upper neighboring pixel (i,j−1) in a state being one selected from States I, II and III. Similarly, the lower edge is composed of the pixels in which each pixel (i,j) is in State IV and having its lower neighboring pixel (i,j+1) in a state being one selected from States I, II and III.

Let set A be made of all the pixels in upper edge and an amount of the pixels in set A is $N_A$. In set A, a specified pixel that is in State IV and has its upper neighbor either in Sate II or in State III is further classified into set B, and an amount of the pixels in set B is $N_B$. A flickering ratio in the upper edge "$FR_U$" is then calculated as follows.

$$FR_U = N_B/N_A$$

A non-flickering ratio "$NFR_L$" and a flickering ratio "$FR_L$" in the lower edge is calculated as follows.

In the lower edge, a pixel in State IV and having its lower pixel in a state being one selected from States I, II and III is classed into set P, and an amount of the pixels in set P is N.

In set P, a pixel in State IV and having its lower neighboring pixel in State I is classed into set Q1, and an amount of the pixels in set Q1 is $N_{Q1}$.

In set P, a pixel in State W and having its lower neighboring pixel in one of States II and III is classed into set Q2, and an amount of the pixels in set Q2 is $N_{Q2}$.

$$NFR_L = N_{Q1}/N_P$$

$$FR_L = N_{Q2}/N_P$$

Accordingly, the upper edge is determined to be in the flickering state if the flickering ratio "$FR_U$" is larger than a threshold $Th_1$; the lower edge is determined to be in the non-flickering state if the non-flickering ratio "$NFR_L$," is larger than another threshold $Th_2$; and the lower edge is determined to be in the flickering state if the flickering ratio "$FR_S$," is larger than the other threshold $Th_3$. These three thresholds can be arbitrary real numbers between 0 and 1, which are designed based on actual needs.

After the aforementioned calculation and determination steps are performed, any one of the three kinds of spatially flickering states can be selected to be a condition of determining that the bright object is in a spatially flickering state. For example, the result of Step 30 is positive when: the upper edge of the bright object in the respective superimposed images is all in the flickering state; or the upper edge of the bright object is all in the flickering state and the lower edge of the bright object is all in the non-flickering state in the respective superimposed images; or both the upper edge and the lower edge of the bright object are in the flickering state, and the upper edge has a moving direction opposite to that of the lower edge, i.e. most of the pixels showing the upper edge and the lower edge in the flickering state are distinguished into one of State II and State III.

Figure 1B:
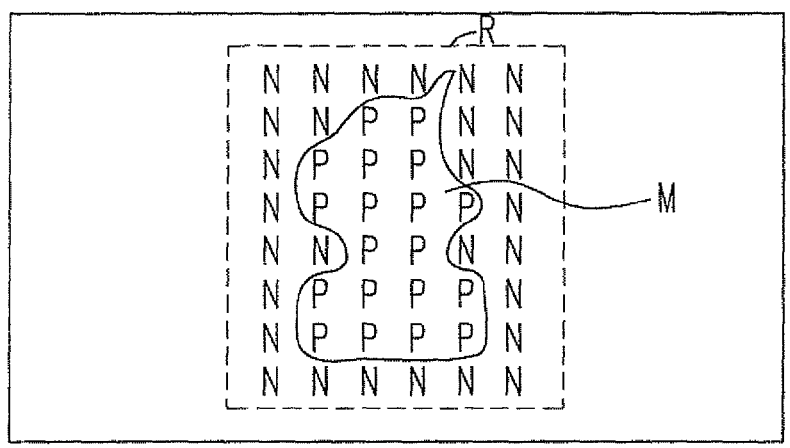
FIGS. 1(B) to 1(J) are diagrams illustrating the implementation of the Step 35 in FIG. 1(A)
Figure 1C:
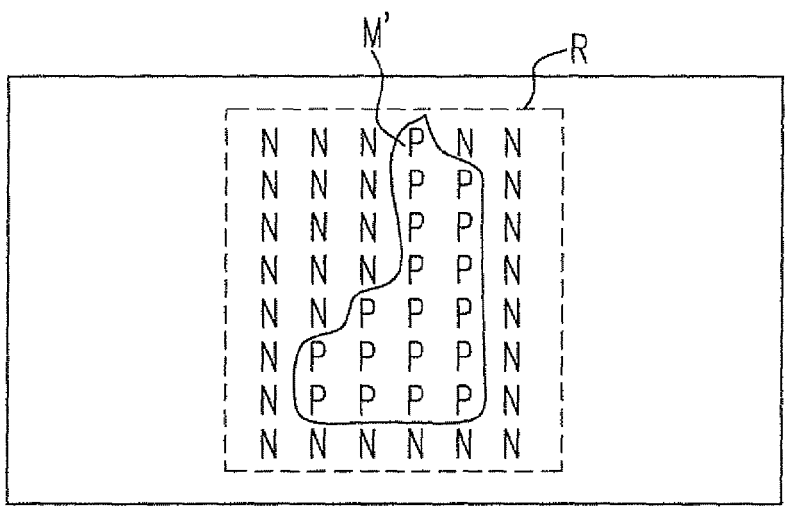
Figure 1D:
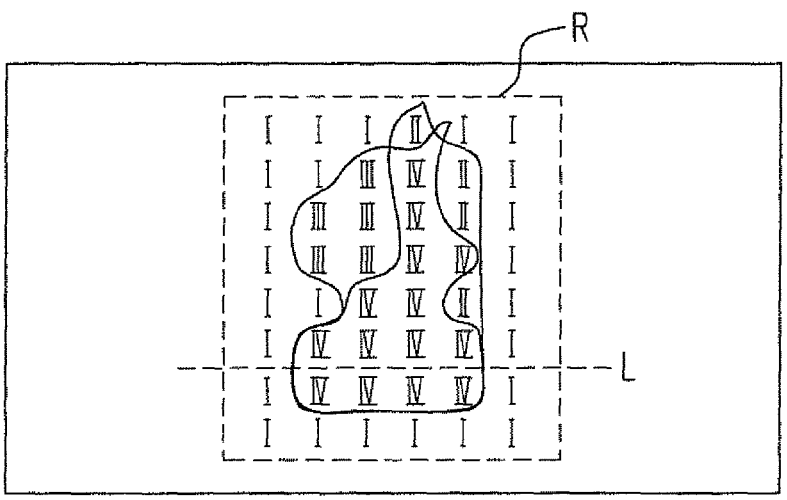
Figure 1E:
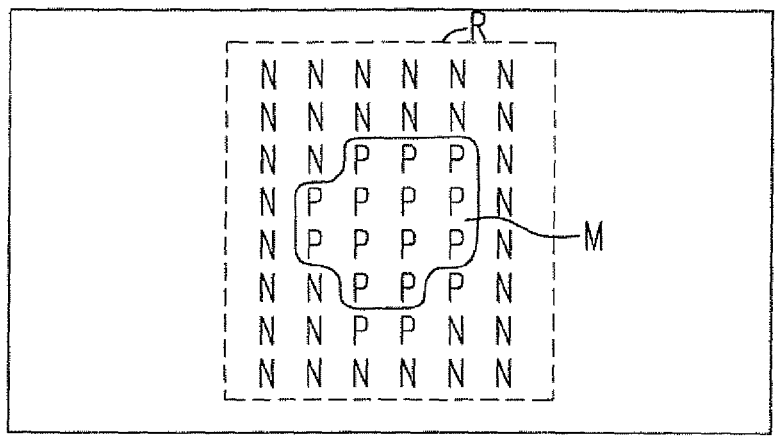
Figure 1F:
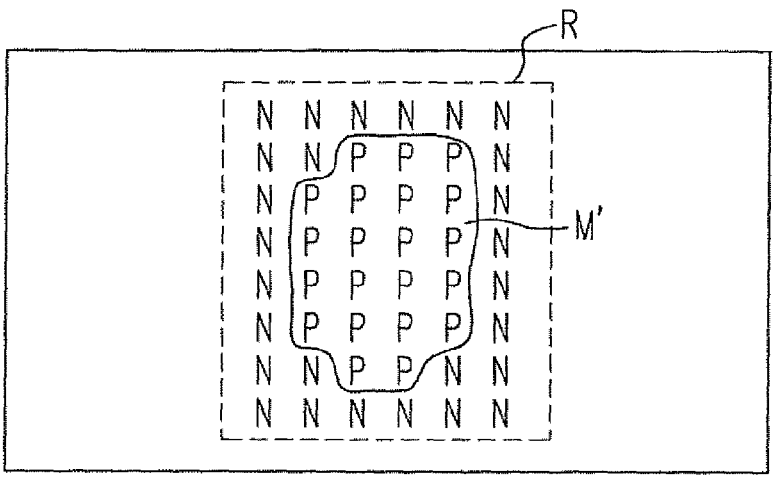
Figure 1G:
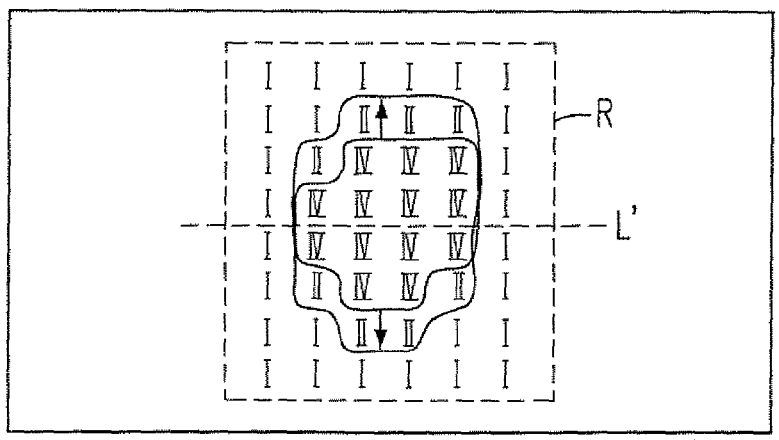

Please refer to FIGS. 1(B) to 1(J), illustrating the implementation of the mentioned embodiment of determining the state of pixels in the images, wherein: FIGS. 1(B) to 1(D) illustrate the first or the second "spatially flickering state"; FIGS. 1(E) to 1(G) illustrate the first or the third "spatially flickering state", while the bright object is expanding; and FIGS. 1(H) to 1(J) also illustrate the first or the third "spatially flickering state", while the bright object is contracting.

Please refer to FIGS. 1(B) to 1(D). FIG. 1(B) is a former image in a superimposed image and has an area R to be analyzed and an area M occupied by the bright object, wherein the pixels in the area M are marked as "P". FIG. 1(C) is a latter image in the superimposed image and has the area R and an area M' occupied by the bright object, wherein the pixels in the area M' are defined as "P". FIG. 1(D) is the superimposed image of FIGS. 1(B) and 1(C), and a division line L is set in the region R. Accordingly, after applying the aforementioned calculation to FIG. 1(D), the results of $N_A=5$, $N_B=4$, and $FR_U=0.8$ can be obtained. If the threshold $Th_1$ is designed as 0.8, the upper edge of the bright object is determined to be in the flickering state. Furthermore, the results of $N_P=4$, $N_{Q1}=4$, and $NFR_L=1.0$ can be obtained from FIG. 1(D), and the lower edge of the bright object is determined to be in the non-flickering state if the second threshold $Th_2$ is designed as 0.8.

Please refer to FIGS. 1(E) to 1(G). FIG. 1(E) is a former image in a superimposed image and has a region R and an area M occupied by the bright object, wherein the pixels in the area M are defined as "P". FIG. 1(F) is a latter image in the superimposed image and has the region R and an area M' occupied by the bright object, wherein the pixels in the area M' are defined as "P". FIG. 1(G) is the superimposed image of FIGS. 1(E) and 1(F), and a division line L' is set in the region R. Similarly, after applying the aforementioned calculation methods to FIG. 1(G), the results of $N_A=4$, $N_B=4$, and $FR_U=1.0$ can be obtained. If the threshold $Th_1$ is designed as 0.8, the upper edge of the bright object is determined to be in the flickering state. Furthermore, the results of $N_P=4$, $N_{Q2}=4$, and $NFR_L=1.0$ can be obtained from FIG. 1(G), and the lower edge of the bright object is determined to be in the flickering state if the third threshold $Th_3$ is designed as 0.8.

According to FIG. 1(G), both the upper edge and the lower edge of the bright object are determined to be in the flickering state. Then, the moving directions thereof will be further analyzed, and the bright object will be determined to be in the third "spatially flickering state" if the upper edge has a moving direction different from that of the lower edge. It can be found in FIGS. 1(E) to 1(G) that the moving direction of the upper edge is upward and that of the lower edge is downward. That is to say, the upper edge has a moving direction opposite to that of the lower edge in FIGS. 1(E) to 1(G) and the bright object therein is expanding. Accordingly, the bright object in FIGS. 1(E) to 1(G) will be determined as a flame.

Figure 1H:
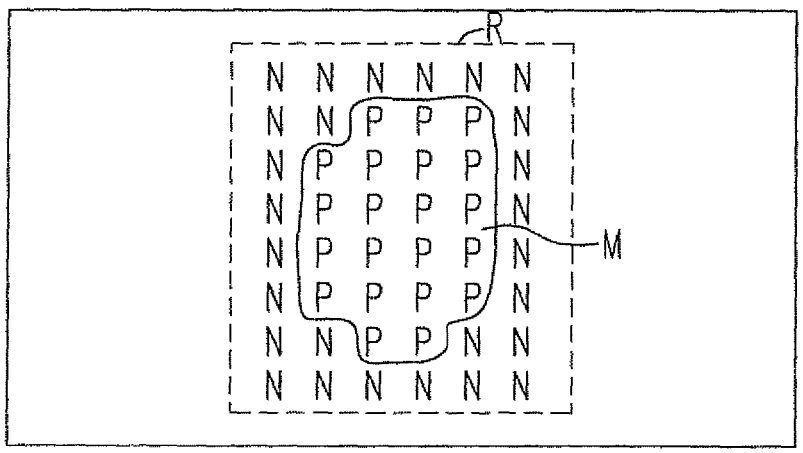
Figure 1I:
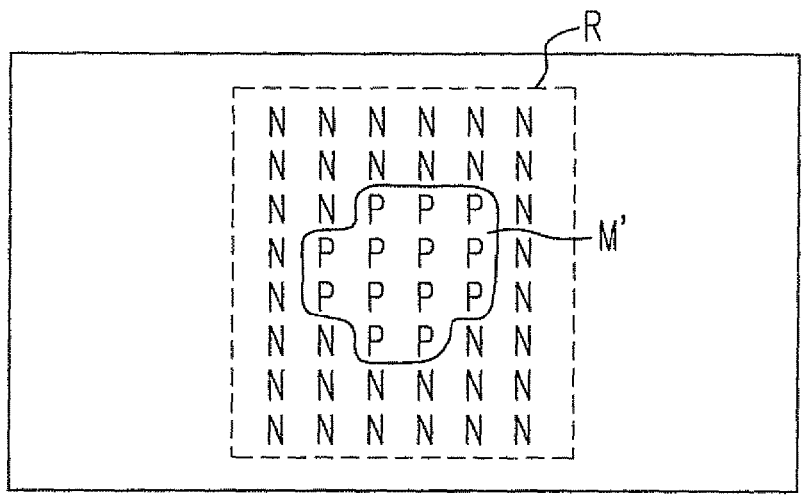
Figure 1J:
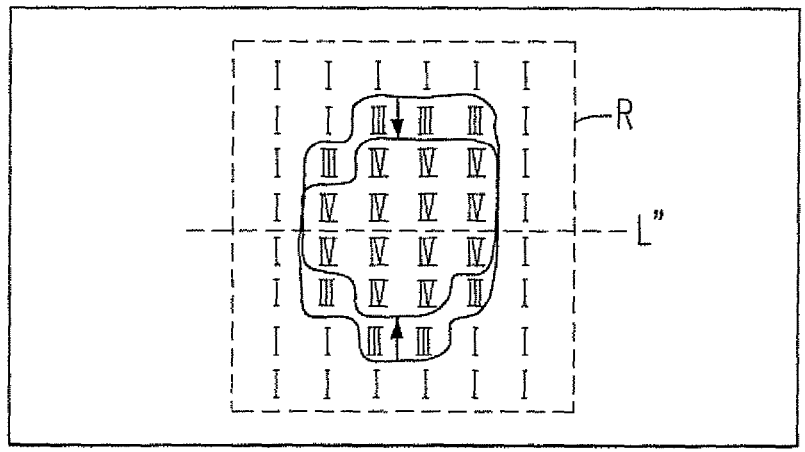
Figure 1K:
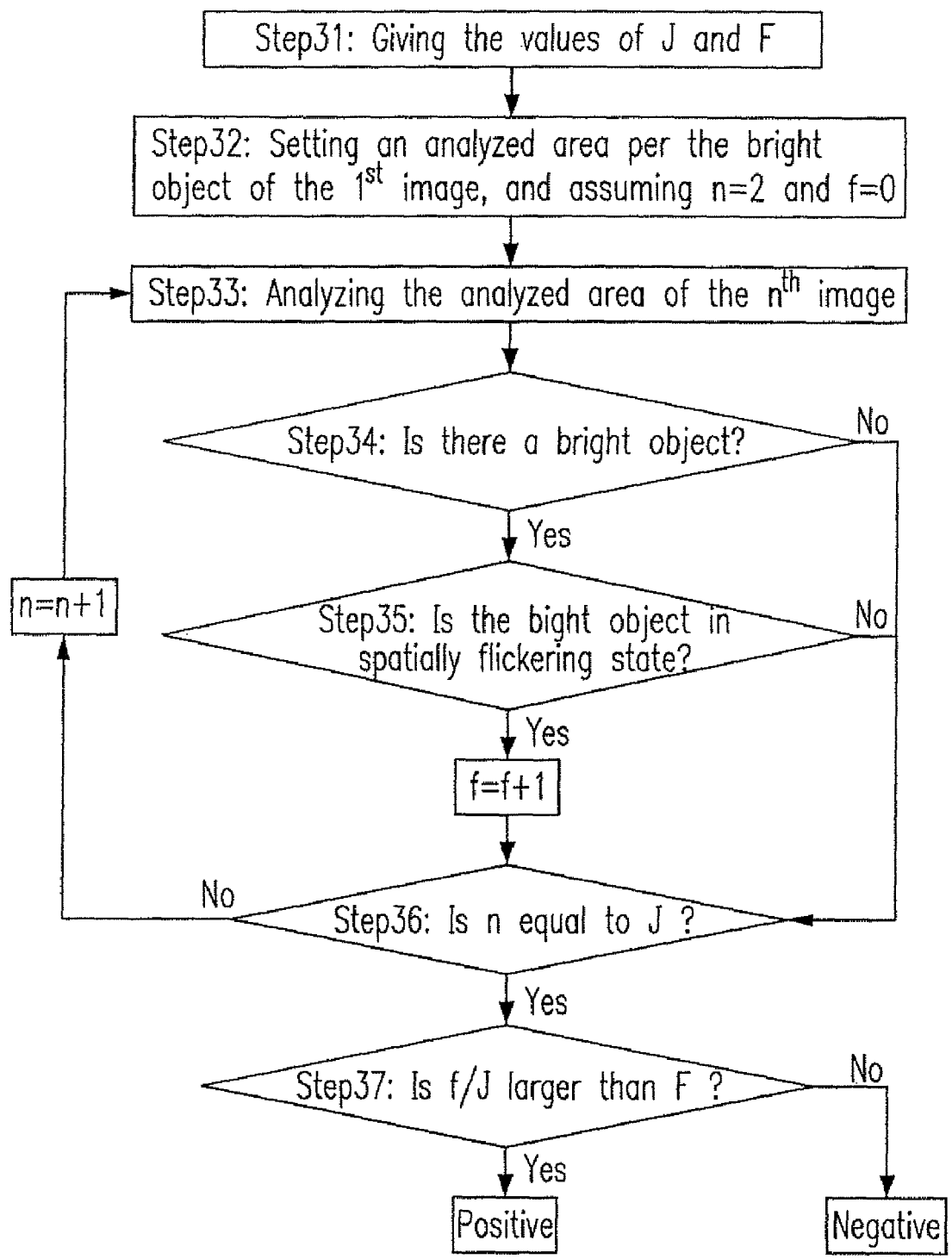
FIG. 1(K) is a detailed diagram illustrating sub-steps of the Step 30 in FIG. 1(A)

Please refer to FIGS. 1(H) to 1(J). FIG. 1(H) is a former image in a superimposed image and has an analyzable region R and an area M occupied by the bright object, wherein the pixels in the area M are defined as "P". FIG. 1(I) is a latter image in the superimposed image and has the region R and an area M' occupied by the bright object, wherein the pixels in the area M' are defined as "P". FIG. 1(J) is the superimposed image of FIGS. 1(H) and 1(I), and a division line L'' is set in the region R. Accordingly, after applying the aforementioned calculation to FIG. 1(J), the results of $N_A=4$, $N_B=4$, and $FR_U=1.0$ can be obtained. If the first threshold value is designed as 0.8, the upper edge of the bright object is determined to be in the flickering state. Furthermore, the results of $N_P=4$, $N_{Q2}=4$, and $NFR_L=1.0$ can be obtained from FIG. 1(J), and the lower edge of the bright object is determined to be in the flickering state if the third threshold $Th_3$ is designed as 0.8.

According to FIG. 1(J), both the upper edge and the lower edge of the bright object are determined to be in the spatially flickering state. Then, the moving directions thereof will be further analyzed, and the bright object will be determined to be in the third "spatially flickering state" if the upper edge has a moving direction different from that of the lower edge. It can be found in FIGS. 1(H) to 1(J) that the moving direction of the upper edge is downward and that of the lower edge is upward. That is to say, the upper edge has a moving direction opposite to that of the lower edge in FIGS. 1(H) to 1(J) and the bright object therein is contracting. Accordingly, the bright object in FIGS. 1(H) to 1(J) will also be determined as a flame.

Refer to FIG. 1(K), the detailed sub-steps of determining that a bright object is regarded as a flame is additionally plotted. If a bright object has been found in an image, these sub-steps are activated. Two important parameters, including J and F, have to be given first (Step 31), where J denotes the total number of images to be analyzed and F is a threshold of Step 37. Step 32 set an area of interest by extending the size of the bright object. In this embodiment, the width and height of AOI are the double of those of bright object. This step 32 also initializes two counts, which are n=2 and f=0. Next, the camera captures the subsequent J images for analysis sub-steps. The same process of detecting a bright object and determining a flickering state is repeatedly performed to these J captured images (Steps 34 and 35). If the analyzed result of each image is positive, the count of f is increased by one. After the all J images are processed (i.e. Step 36 is with positive result), a decision unit is applied to judge whether this detected bright object is considered as a flame (Step 37).

Furthermore, for increasing the accuracy of the flame detecting method and reducing a false alarm, J may be set larger so that the amount of images to be captured and analyzed can be increased. Besides, the steps from capturing images to analyzing the captured images can be repeated before performing the step of determining the bright object as a flame. For example, Step 30 illustrated in FIG. 1(A) can be repeated more times to proceed to the following steps for confirming that there certainly exists bright objects.

Figure 2:
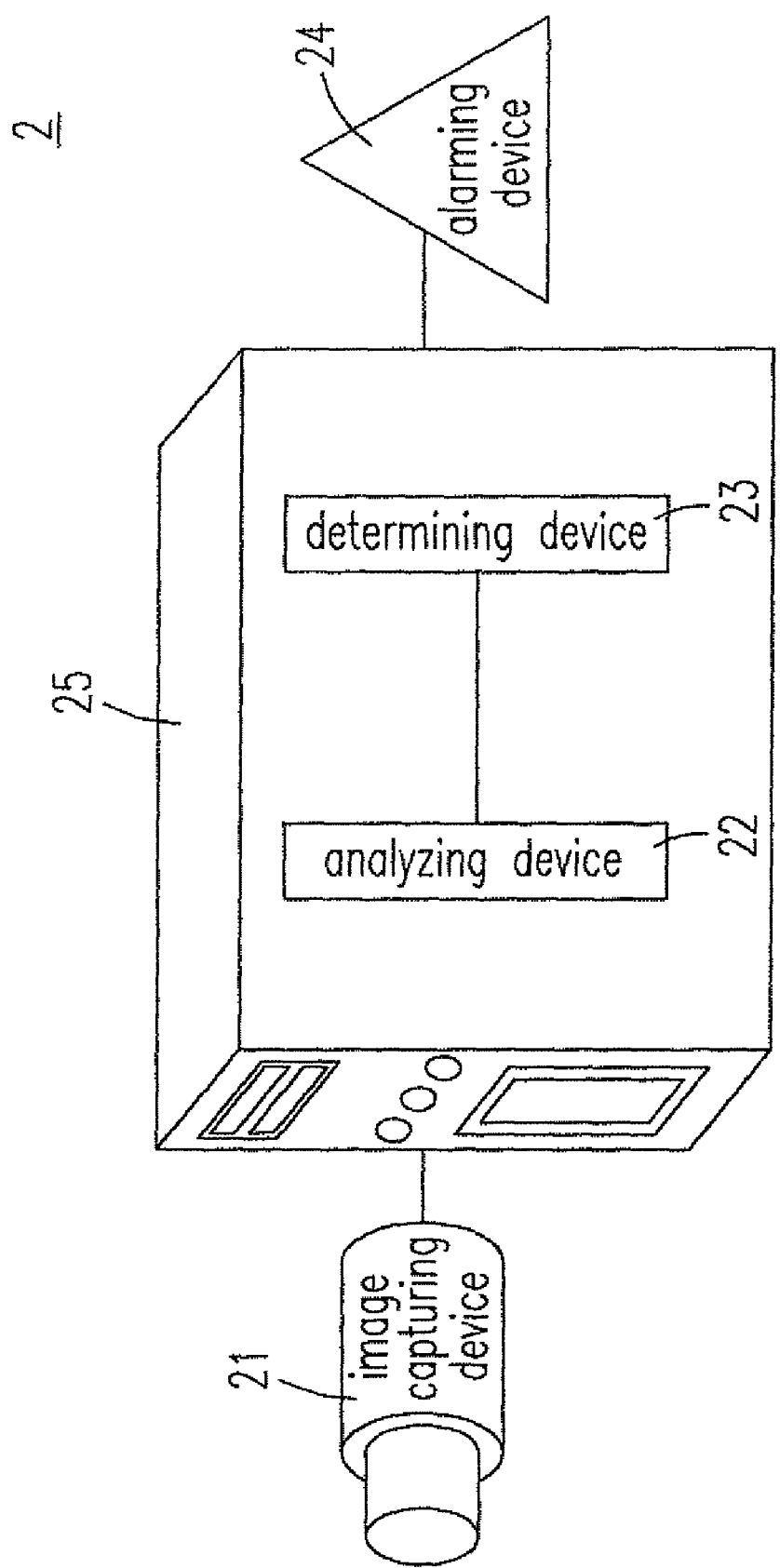
FIG. 2 is a diagram showing a system for detecting a flame according to a preferred embodiment of the present invention.

Please refer to FIG. 2, showing a flame detecting system according to a preferred embodiment of the present invention. The flame detecting system 2 comprises an image capturing device 21, an analyzing device 22, a determining device 23 and an alarming device 24. The image capturing device 21 is one of a fixed video camera and a movable video camera for capturing a plurality of images of a monitored area. The image capturing device 21 is coupled to a host computer 25 via the internet or other connection ways. The analyzing device 22 is disposed in the host computer 25 and coupled to the image capturing device 21. The analyzing device 22 analyzes whether a bright object exists in the plurality of images and whether the bright object is in a spatially flickering state. The determining device 23 is also disposed in the host computer 25 and coupled to the analyzing device 22, which determines the bright object as a flame when the bright object is in the spatially flickering state. The alarming device 24 is coupled to the determining device 23, and actuates an alarm when the bright object is determined as the flame by the determining device 23, wherein the alarm can be transmitted to a fire bureau or other rear systems.

According to the above-mentioned embodiment, the flame detecting system 2 can be connected to a new or existed surveillance system of a building. That is to say, the image capturing device 21 may be a video camera installed in a building. Hence, when the computers or other rear systems receiving the captured images are configured to have the analyzing device 22 and the determining device 23, the new or existed surveillance system of the building will have the function of flame detection as described in the present invention.

Figure 3:
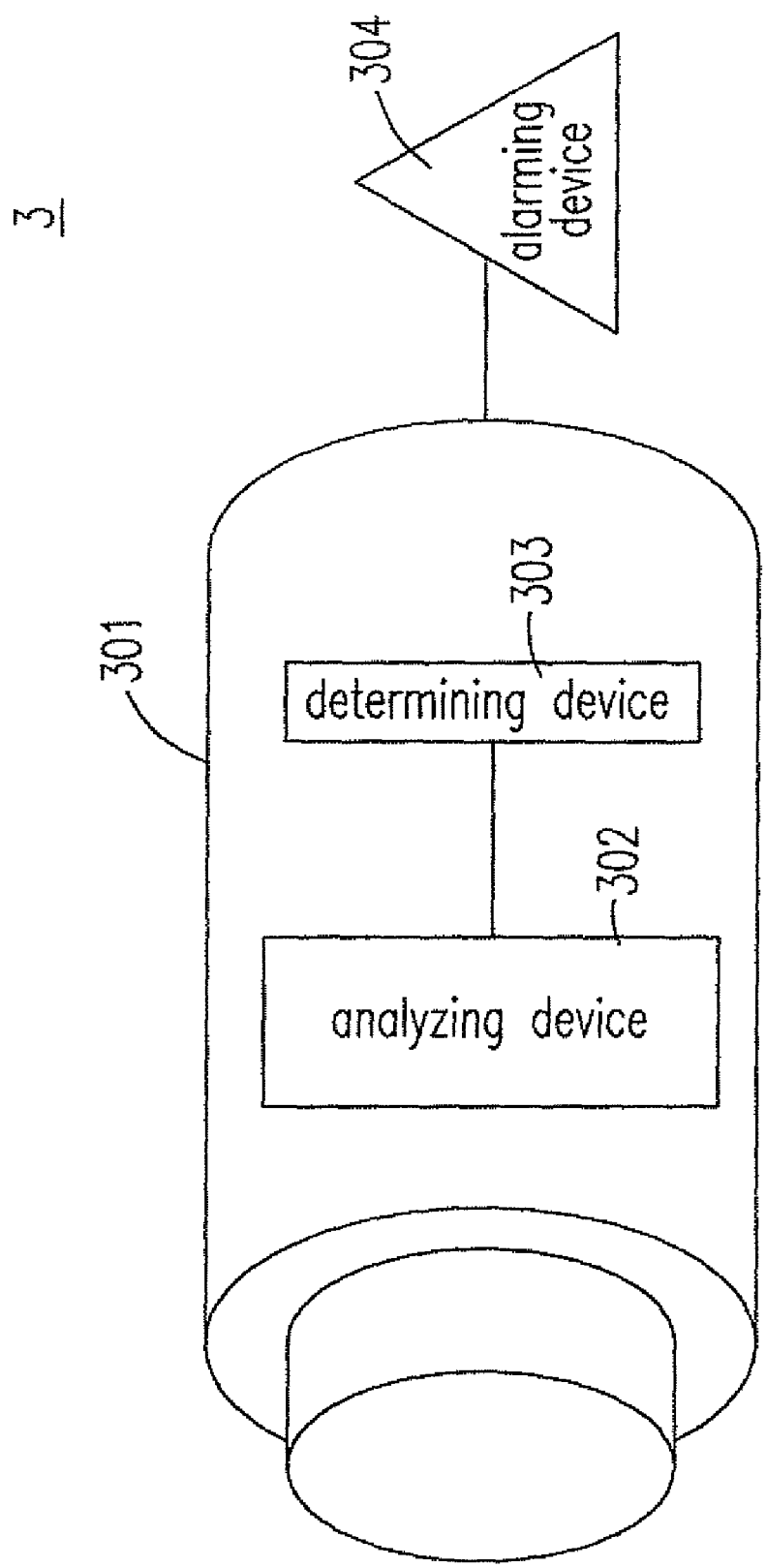
FIG. 3 is a diagram showing a system for detecting a flame according to another preferred embodiment of the present invention.

Please refer to FIG. 3, showing a flame detecting system according to another preferred embodiment of the present invention. The flame detecting system 3 comprises an image capturing device 301, an analyzing device 302, a determining device 303 and an alarming device 304. The image capturing device 301 is a digital video recorder for capturing and recording a plurality of images. The analyzing device 302 is a digital signal processing chip for determining whether a bright object exists in the plurality of images and analyzing whether the bright object is in a spatially flickering state. The determining device 303 determines the bright object as a flame when the result obtained from the analyzing device 302 is positive, and the alarming device 304 coupled thereto will actuate an alarm.

Noted that all of the aforementioned thresholds in the present invention can be arbitrarily set according to actual conditions of the monitored area. For example, if the monitored area is a location having small probability of fire, the thresholds may be set higher than other monitored areas, so that a false alarm may be effectively reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for detecting a flame, comprising steps of:
   (a) capturing a plurality of images;
   (b) determining whether a bright object exists in the plurality of images, wherein the step (b) comprises sub-steps of:
   classifying at least a specific pixel having components of Y, U and V as a bright pixel if the components of Y, U and V respectively meet predefined intervals; and
   grouping and labeling the bright pixel(s) to form a bright object;
   (c) analyzing whether the bright object is in a spatially flickering state, wherein the spatially flickering state comprises a state being one selected from a group consisting of:
   the bright object having an upper edge in a flickering state;
   the bright object simultaneously having an upper edge in the flickering state and a lower edge in a non-flickering state; and
   the bright object having an upper edge and a lower edge both in a flickering state, and the upper edge having a moving direction different from that of the lower edge; and
   (d) determining the bright object as the flame if the bright object is in the spatially flickering state.

2. The method according to claim 1, wherein the step (c) further comprises sub-steps of:
   setting an area of interest to be analyzed by extending a size of the bright object;
   superimposing the area of interest of two successive images and finding a class of the spatially flickering state of the bright object;
   calculating a flickering ratio of the upper edge, a flickering ratio of the lower edge, and a non-flickering ratio of the lower edge according to the superimposed result;
   determining that the upper edge is in the flickering state if the flickering ratio of the upper edge is larger than a predefined threshold $Th_1$; and
   determining that the lower edge is in the non-flickering state if the non-flickering ratio is larger than a predefined threshold $Th_2$, and determining that the lower edge is in the flickering state if the flickering ratio of the lower edge is larger than a predefined threshold $Th_3$.

3. The method according to claim 1, wherein the component of Y denotes a luminance, the components of U and V are chrominance components, and the predefined intervals are defined by following formula IF $(220 \leq Y(i,j) \leq 248)$ AND $(-18 \leq U(i,j) \leq 2)$ AND $(-8 \leq V(i,j) \leq 18)$, THEN the specific pixel $(i,j)$ is a bright pixel.

4. The method according to claim 1, further comprising a step of acquiring subsequent images to be analyzed for confirming an existence of the flame.

5. The method according to claim 4, further comprising a step of sending an alarm if the existence of the flame is confirmed.

6. A system for detecting a flame, comprising:
   an image capturing device capturing a plurality of images;
   an analyzing device coupled to the image capturing device, and analyzing whether a bright object exists in the plurality of images and whether the bright object is in a spatially flickering state, wherein the spatially flickering state includes a state being one selected from a group consisting of:
   the bright object having an upper edge in a flickering state;
   the bright object simultaneously having an upper edge in the flickering state and a lower edge in a non-flickering state; and
   the bright object having an upper edge and a lower edge both in a flickering state, and the upper edge having a moving direction different from that of the lower edge; and
   a determining device coupled to the analyzing device, and determining the bright object as the flame if the bright object is in the spatially flickering state.

7. The system according to claim 6, further comprising an alarming device coupled to the determining device, and sending a fire alarm when the bright object is determined as the flame.

8. The system according to claim 6, wherein the image capturing device is a stationary video camera.

9. The system according to claim 6, wherein the analyzing device is one of a computer and a digital signal processing chip.

10. The system according to claim 6, wherein the analyzing device analyzes whether an object in the plurality of images is a bright object.

11. A method for detecting a flame, comprising steps of:

(a) capturing a plurality of images;

(b) determining whether a bright object exists in the plurality of images;

(c) analyzing whether the bright object is in a spatially flickering state, wherein the spatially flickering state includes a state being one selected from a group consisting of:

the bright object having an upper edge in a flickering state;

the bright object simultaneously having an upper edge in the flickering state and a lower edge in a non-flickering state; and the bright object having an upper edge and a lower edge both in a flickering state, and the upper edge having a moving direction different from that of the lower edge; and (d) determining the bright object as the flame if the bright object is in the spatially flickering state.

* * * * *